United States Patent [19]

Fruchtbaum et al.

[11] Patent Number: 5,490,920
[45] Date of Patent: Feb. 13, 1996

[54] SELF-CLEANING SEDIMENTATION UNIT

[75] Inventors: Joseph Fruchtbaum, Houston; Frederick B. Kronmiller, Tomball, both of Tex.

[73] Assignee: The M. W. Kellogg Company, Houston, Tex.

[21] Appl. No.: 310,819

[22] Filed: Sep. 22, 1994

[51] Int. Cl.$^6$ ........................................... B01D 21/18
[52] U.S. Cl. ........................... 210/112; 210/527/530
[58] Field of Search ........................... 210/523, 525, 210/527, 530, 532.1, 104, 112, 138

[56] References Cited

U.S. PATENT DOCUMENTS

| | | | |
|---|---|---|---|
| 2,880,877 | 4/1959 | Sambraus | 210/530 |
| 3,591,492 | 5/1970 | Neuspiel | 210/527 |
| 3,807,560 | 4/1974 | Pentz et al. | 210/527 |
| 3,822,788 | 7/1974 | Dunkers et al. | 210/527 |
| 3,969,249 | 7/1976 | Dodd et al. | 210/527 |
| 4,094,785 | 6/1978 | Booty | 210/527 |
| 4,190,541 | 2/1980 | Wade et al. | 210/525 |
| 4,687,576 | 8/1987 | Hardison | 210/530 |

OTHER PUBLICATIONS

Dorr–Oliver company engineering brochure.

*Primary Examiner*—Christopher Upton
*Attorney, Agent, or Firm*—The M. W. Kellogg Company

[57] ABSTRACT

A gravity sedimentation unit for thickening or clarifying a solids containing liquid is disclosed. The unit comprises a settling basin for receiving the feed and permitting the suspended solids to settle. A pump moves around the basin to discharge solids accumulating at the bottom. Support and vertical positioning of the pump is effected by a pump suspension which comprises a winch and a solids level detector. Horizontal positioning of the pump is effected by a bridge-type crane including a traverse with a drive for moving the traverse over the basin and a motorized trolley for moving the pump suspension back and forth along the traverse. Control of the pump travel is effected by a controller programmed to carry out regular search patterns through the basin.

20 Claims, 6 Drawing Sheets

SELF-CLEANING SEDIMENTATION UNIT

FIELD OF THE INVENTION

The present invention relates to a sedimentation unit useful for gravity separation of solids suspended in liquid.

BACKGROUND OF THE INVENTION

Large scale sedimentation units for the continuous gravity separation of particulate matter suspended in a liquid (generally water) find wide spread use in several industries including mining and treatment of wastewater in various industrial, environmental and chemical processing operations. Depending on whether the desired end product is the liquor or the suspended solids, such units are known either as thickeners for increasing the concentration of suspended solids such as ores, or clarifiers for separating waste solids and obtaining a purified liquid.

The art of thickening or clarifying a solids-in-water system by continuous gravity sedimentation is very well established. Such sedimentation units typically comprise a large sized circular or rectangular basin having a bottom sloped around a central outlet and receiving a low turbulence feed of the solid-liquid system to be separated. As the feed liquid stands in the basin, gravity over time concentrates suspended particles at the bottom. The concentrated solids layer is then raked by a rotating raking mechanism to a discharge cone and pumped as underflow from the unit. Concurrently, a liquid which has been clarified by the settling action is discharged as overflow from the basin and captured by a launder attached to the perimeter of the basin.

A major operational difference between a thickener and clarifier is typically seen in the solids concentration of the feed. A thickener will generally have a higher solids concentration which increases the torque requirement of the raking mechanism. A clarifier generally receives a feed having a low solids concentration and a small particle size. As a result, chemical flocculators are commonly employed.

Drawbacks to the present art of continuous gravity sedimentation are significant. The raking mechanism and other submerged equipment have relatively high maintenance costs. Abnormal resistance resulting from surges in dense-feed solids, excessive amounts of oversize solids, sloughing of solids from the sides of the basin or other obstructions to the passage of the raking members can cause such members to become stuck or buried and overload the drive. Also, the solids discharge lines which are also generally submerged can become plugged. Maintenance of submerged equipment generally requires the basin to be drained and can result in long operational down times. In addition, the raking mechanism requires high torque drive units which are very costly.

Therefore, a need exits for a continuous gravity sedimentation unit which can be operated without high torque drives and associated submerged equipment for reduced maintenance problems and costs.

SUMMARY OF THE INVENTION

A continuous gravity sedimentation unit of the present invention comprises a submersible pump capable of automatically seeking solids accumulations formed on the bottom of a gravity settling basin and pumping a slurry of the thickened solids into a channel located at the periphery of the basin wall. By sending the submersible pump to the solids accumulations and pumping the accumulations from the tank instead of raking the accumulations into an underflow discharge cone, the use of a high torque raking mechanism and an associated drive unit and bearings can be eliminated. In addition, submerged equipment needing maintenance can be eliminated except for the pump itself which is designed for easy withdrawal from the basin.

As one embodiment, the present invention provides a sedimentation unit for gravity separation of solids suspended in a liquid. As a first element, a basin having an inlet for introducing a liquid containing suspended solids is provided. The basin comprises a bottom area for accumulating settled solids from the liquid, and a liquid outlet for discharging liquid of reduced solids content. A pump is provided for pumping a slurry of the accumulated solids from the basin to a slurry discharge. The unit comprises a horizontal traverse with a drive for moving the traverse over the basin. A pump suspension is provided for supporting the pump from the traverse and vertically positioning the pump with respect to the traverse. A motorized trolley is provided for supporting the pump suspension from the traverse and adapted to move and reciprocate the pump suspension along a length of the traverse. A solids detector is provided for sensing a presence or absence of solids adjacent a suction of the pump. A controller adapted to activate the pump when the solids detector senses the presence of the solids is provided adjacent the pump suction.

In a preferred embodiment, the present sedimentation unit comprises a basin with a circular wall. The traverse has one end mounted on a central bearing and the drive comprises a motorized trolley mounted at the other end for movement along a rail adjacent the basin wall and rotation of the traverse about the bearing. The inlet comprises a feed well adjacent the central bearing and the liquid outlet and slurry discharge comprise channels mounted adjacent the basin wall. The traverse has elevated legs to raise the pump above the basin wall.

In an alternate embodiment, the unit comprises a rectangular basin wall wherein the drive comprises motorized cartridges mounted at opposite ends of the traverse for movement along the rail on opposing side sections of the wall. The inlet preferably comprises a feed well adjacent a first end section of the wall, the liquid outlet comprises a channel adjacent a second opposite end section of the wall, and the slurry discharge includes a channel adjacent one of the side sections of the wall.

The unit is preferably adapted for automated removal of accumulated solids by repeatedly moving the traverse over the basin and the pump suspension back and forth across the traverse. The movements of the traverse over the basin and the pump suspension across the traverse preferably have independently adjustable rates of travel. A pump winch operable by the controller is preferably provided to adjust the vertical position of the pump to position the pump suction in an upper layer of the accumulated solids. A timer is preferably provided for actuating the movement of the traverse and pump suspension at predetermined time intervals.

The solids detector can comprise a capacitance or a high frequency sensor mounted adjacent the pump suction. An agitator spaced below the impeller of the pump can be mounted on a common shaft with the impeller for rotation therewith. The solids detector can comprise a torque switch operatively associated with the agitator shaft to provide a signal to the controller when the agitator is rotated in accumulated solids. A two-speed motor can be included for rotating the impeller shaft at a relatively low speed for sensing the presence of the accumulated solids and at a relatively high speed for pumping the accumulated solids.

Alternatively, the solids detector can comprise a stress sensor operatively associated with the pump suspension to provide a signal to the controller when the suspension experiences a bending moment caused by resistance to horizontal movement of the pump into or through accumulated solids. A controller operative with the pump winch in the pump suspension and the solids detector is preferably provided to vertically position the pump suction in a layer of accumulated solids.

DETAILED DESCRIPTION OF THE INVENTION

A pump submersible in a gravity sedimentation basin according to one embodiment of the invention can automatically travel around the basin in search of accumulations of settled solids and then discharge such solids accumulations from the basin as a slurry. The traveling pump is provided with means for horizontally and vertically positioning in the basin and detection of accumulated solids. The traveling and detection means are preferably controlled by a controller programmed to ensure regular coverage of the basin floor by the pump.

Figure 1:
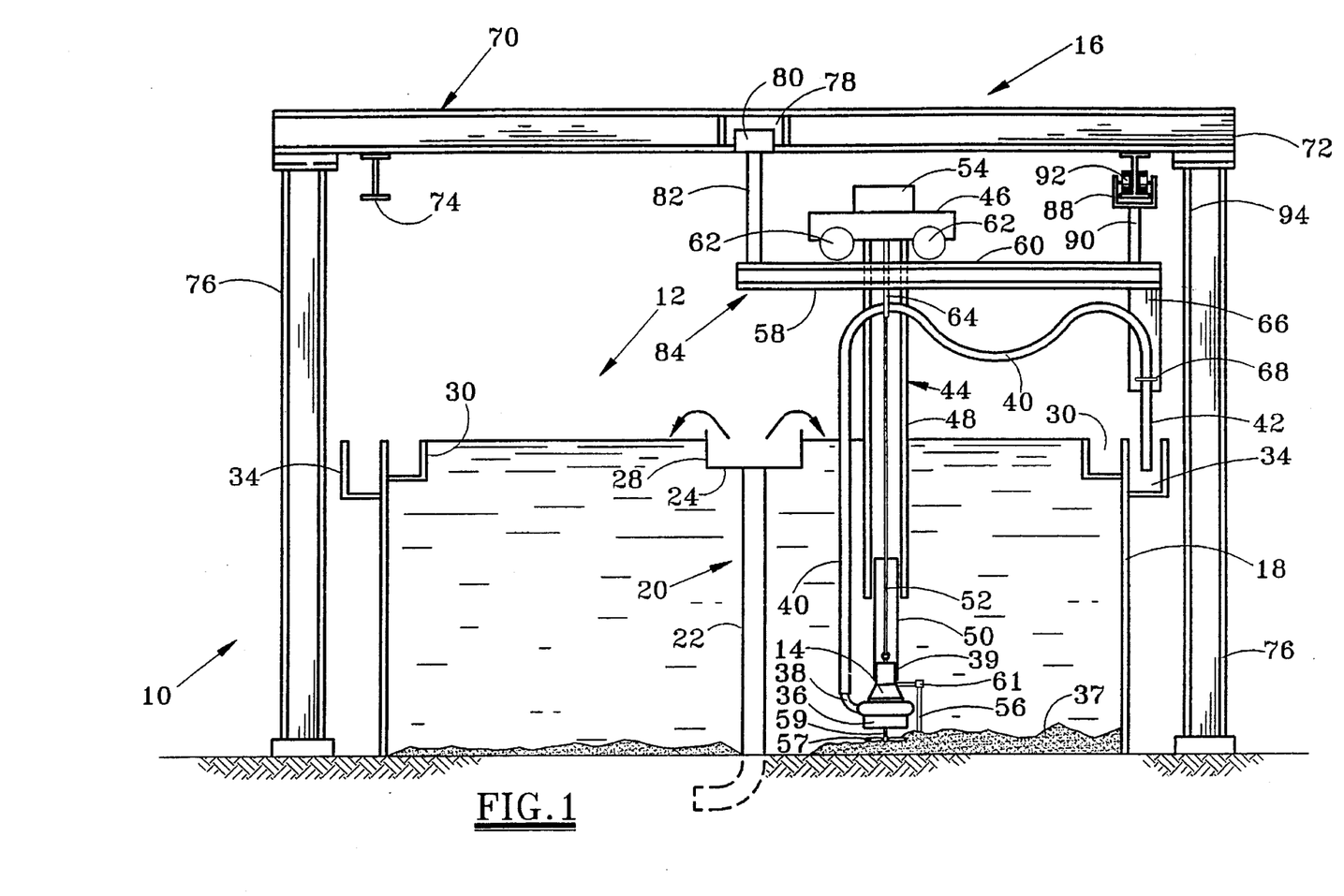
FIG. 1 is a cross-sectional view of a continuous gravity sedimentation unit of the present invention showing a unit having a circular basin, a rigid pump suspension, and a modified bridge-type crane comprising a rotating radial traverse supported by girders for moving a submersible pump around the basin.

Referring to FIGS. 1–9 wherein like numbered parts are indicated by like numerals, a continuous gravity sedimentation unit 10 of the present invention comprises a basin 12 suitable for receiving a liquid stream having solid particles suspended therein and permitting sedimentation of the suspended solids by the action of gravity thereon, as best seen in FIG. 1. The basin 12 has operatively associated therewith a submersible pump 14 for discharging accumulations of solids from the basin 12 and a bridge-type or modified bridge-type crane 16 for moving the pump 14 around the basin 12 towards the solids accumulations therein. As is well known in the art, the capacity of the basin 12 will depend on desired use, flowrate of the liquid to be clarified (or solids to be thickened), particle size of the solids, needed residence time, and the like variables. Such vessels are frequently circular in shape (but rectangular-shaped structures can also be used), are generally made of concrete or steel depending on size required, and can vary in diameter from a few meters to 200 meters or more.

Figure 2:
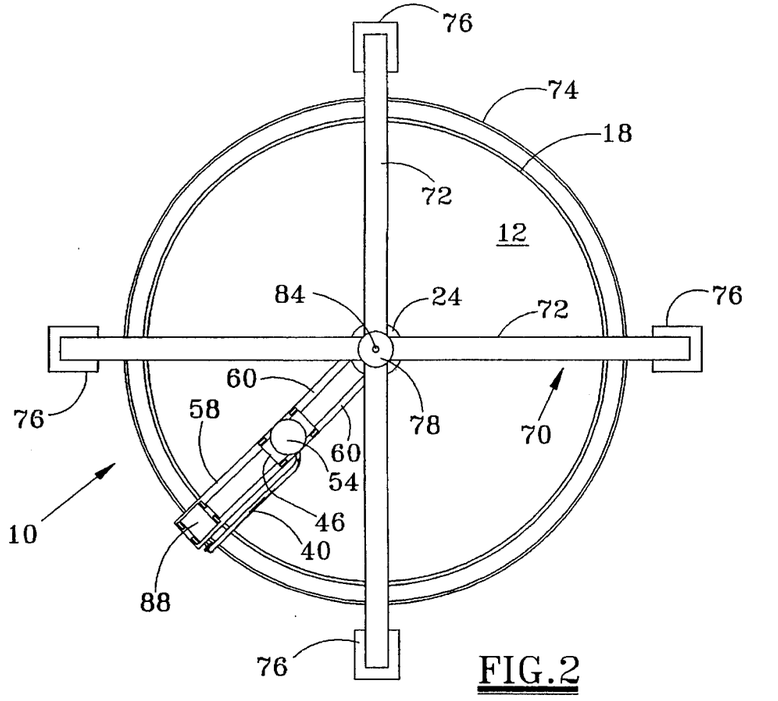
FIG. 2 is a plan view of the unit of FIG. 1.

A basin 12 having a circular wall 18 comprises an inlet 20 for introduction and substantially even distribution of feed liquid containing the suspended solids. The inlet stream is preferably introduced in a manner which minimizes turbulence in any liquid standing in the basin 12. The inlet 20 is made up of a pipe 22 feeding a feedwell 24. For a circular basin geometry as seen in FIGS. 1–2, the feedwell 24 is preferably located at a top area of the basin concentric with a central axis to ensure an even distribution of the incoming liquid and minimize disturbance of the settling solids.

The incoming stream 22 overflows walls 28 of the feedwell 24 into the basin 12. As well known in the art, the feedwell 24 can include various internal devices (not shown) to minimize incoming feed velocity, promote flocculation, and increase the settling rate and detention efficiency of the unit 10 such as by splitting of the feed into two equal streams. The split streams are then fed tangentially to the feedwell 24 and directed by the internal cyclone elements into impingement with each other to substantially dampen the feed velocity.

Liquid having a reduced solids content is discharged as overflow from the basin 12 into a liquid outlet channel 30 mounted adjacent the basin wall 18. The liquid outlet channel 30 can be mounted on an interior or exterior side of the wall 18 in accordance with practitioner preference. The liquid outlet channel 30 includes a sluice or pipe (not shown) to withdraw the clarified liquid therefrom. The recovered liquid having a reduced solids concentration can be directed to a tank, sump or similar holding area (not shown) and depending on the process at hand, can be reused or sent for further purification.

Solids settling from the liquid standing in the basin 12 accumulate on a bottom thereof. The bottom can be flat or have a slope suitable for directing solids accumulations in a desired direction within the basin 12. As an example, a sloped bottom area can be designed to form trough regions (not shown) having a regular pattern to maximize accumulations therein and minimize the area of travel required by the pump 14 to substantially remove a bulk of the settled solids.

In the practice of the present invention, the pump 14 travels around basin 12 to send the accumulated solids as a slurry stream to a slurry discharge channel 34. The pump 14 has a suction inlet 36 positionable adjacent solids accumulated on the bottom, and a discharge outlet 38 attached to a flexible conduit or hose 40. The conduit 40 has an end 42 positioned over the slurry discharge channel 34. Pump 14 typically comprises a vertical or submersible centrifugal-type pump designed for underwater operation and conventionally available from several manufacturers.

The slurry discharge channel 34 can be mounted adjacent the interior or exterior side of the wall 30 either adjacent or opposite the liquid outlet channel 30. In FIG. 1, the slurry channel 34 is shown mounted outside the basin wall 18 and opposite the liquid channel 30 which is mounted inside the wall 18. The slurry discharge channel 34 includes a sluice or pipe (not shown) to withdraw the slurry therefrom for collection in a sump or tank (not shown). The recovered slurry stream can either be disposed of or sent for further thickening and/or processing.

The pump 14 is vertically supported in the basin 12 by a pump suspension apparatus 44 suitable for inhibiting twisting and/or rotation about the vertical axis in the operation of the pump 14. The suspension 44, in turn, is attached to a horizontal motorized trolley 46 operatively associated with the crane 16. As one exemplary embodiment, the pump 14 can be rigidly held by a suspension 44 comprising a larger guide 48 attached at an upper end to the trolley and having a smaller handle 50 slidable therein and fixedly connected at a lower end to the pump 14. The guide 48 and handle 50 cooperate to inhibit the aforementioned twisting and/or rotation about the axis of the suspension 44.

Elevation of the pump 14 is preferably effected by sliding the inner handle 50 into the interior of the outer guide 48 by drawing in a length of a cable 52 in the suspension 44. The cable 52 is attached to the pump 14 at one end and to a winch 54 mounted in the trolley 46 at the other end.

Figure 3:
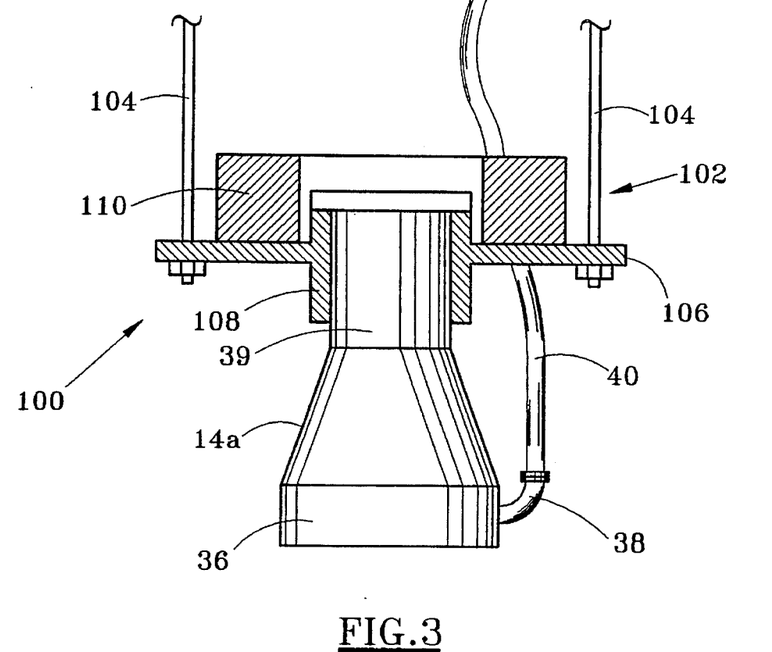
FIG. 3 is a side view in partial cross-section of an alternative pump suspension apparatus comprising a weighted collar and suspending cables.
Figure 4:
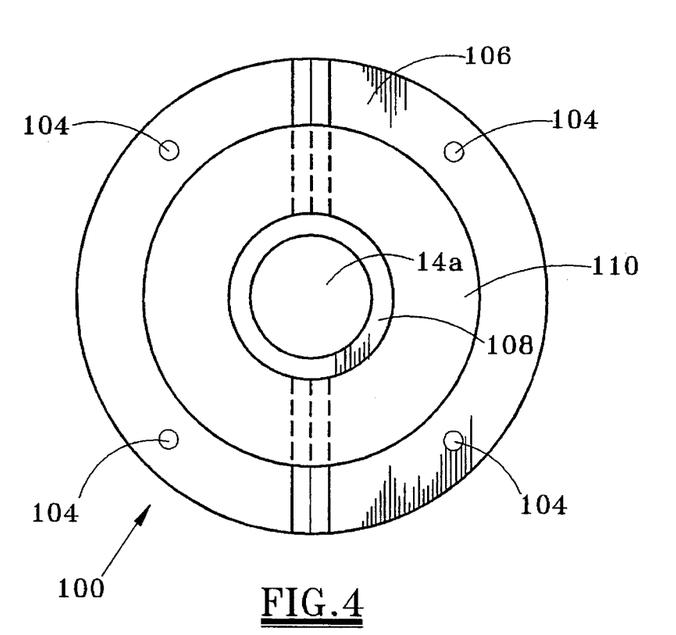
FIG. 4 is a top view of the pump suspension shown in FIG. 3.

Another exemplary embodiment 100 of the pump suspension 44 (as best seen in FIGS. 3–4) comprises a weighted collar 102 attached to the pump 14a and suspended from the trolley 46 by one or more pairs of cables 104. The collar 102 comprises an annular plate 106 having a cylindrical inside wall 108 for attachment to the pump 14a. The plate 106 can be used to support a weighted donut 110, for example, to increase the inertial mass of the collar 102 to minimize rotation about the vertical axis of the suspension 100. The collar 102 is preferably formed as two halves which can be bolted together around the circumference of the pump 14a at a drive end 39. The height of the pump 14a is adjusted by drawing in or letting out the cables 104 from a winch(es) in the support as in FIGS. 1–2.

The winch 54 shown in FIG. 1 is preferably operated in a control loop with a solids level detector 56 for sensing the presence or absence of accumulated solids 37 and automatically positioning the pump suction 36 in an upper layer thereof. Level detection of the accumulated solids can be accomplished by any of a number of different detector devices and associated control loops. As one example, the level detector 56 can comprise a probe which senses solids level by determination of property differences of various strata in the basin. Such determinations are well known in the art and can include turbidity measurement (i.e., light reflection/refraction), radar, differences in electrical conductivity, differences in viscosity or drag, differences in thermal conductivity, differences in density, and the like.

Alternatively, the pump 14 can be provided with an agitator 57 positioned in the pump suction 36 and turned by an impeller shaft 59. A torque switch (not shown) operatively associated with the shaft can be used to sense differences in drag on the agitator 57. When the agitator 57 is used in conjunction with the torque switch, the pump 14 can be powered by a motor (not shown) having two speeds—a slow speed for torque measurements and a high speed for pumping the solids slurry. Other types of level detectors include a capacitance or high frequency sensor (not shown) positioned below the pump suction 36 and a stress sensor (not shown) employed by the pump suspension 44 to detect flexing in the suspension pipes 48, 50 due to resistance from the accumulated solids 37.

A signal from the level detector 56 is fed to a controller 61 as part of a control loop to automatically commence pumping action when accumulated solids are detected, adjust the pump elevation to maintain the position of the pump suction with respect to the solids level and commence horizontal movement of the pump 14 in search of additional solids accumulations or on the detection of obstructions which the pump 14 can not handle.

As mentioned above, the horizontal positioning of the pump 14 around the basin 12 is effected by the crane 16. A modified bridge-type crane suitable for use with a circular shaped basin can be seen FIGS. 1–2. The crane 16 comprises a traverse or modified bridge 58 extending along the radius of the basin 12 from a centerpoint to the perimeter. The traverse 58 provides a track 60 for operating the motorized trolley 46 back and forth in a reciprocating manner along the radius of the basin 12. As known in the art, the trolley 46 preferably includes motorized trolley-type wheels 62 for engaging the track 60 and generally houses the various drive units (electric, pneumatic or hydraulic) (not shown) associated with the wheels 62 and the winch 54.

The trolley 46 further includes a hanger 64 for supporting the flexible body of the conduit 40 and avoiding possible entanglement with the pump suspension 44 so that the conduit length can be adjusted with respect to the position of the trolley 46 from the slurry channel 34. The traverse 58 incorporates an arm 66 depending from the peripheral end thereof to fixedly station the conduit nozzle 42 over the slurry channel 34 by means of a bracket 68.

The modified bridge crane 16 also comprises a superstructure 70 preferably formed from orthogonal girders 72 spanning the basin diameter. The girders 72 are adapted for rotatably supporting the traverse 58 above the basin 12 and fixedly supporting a circular rail 74 extending along the basin perimeter. The girders 72 are supported, in turn, by a plurality of legs 76 preferably placed outside the basin wall 18. A housing 78 containing a bearing 80 is positioned below the intersection of the girders 72. The bearing 80 supports rotation of the traverse 58 about the plane of the basin 12. The bearing 80 includes a journal 82 attached to an inside end of the traverse 58 to form a pivot point 84 therefor. The outer end of the traverse 58 is attached to a drive 88 operatively associated with the rail 74 so that operation of the drive 88 effects the rotation of the traverse 54 with respect to the basin 12 about the pivot point 84.

The rail 74 preferably comprises a monorail-type I-beam. The drive 88 includes a depending shaft 90 for attachment to the traverse 58, wheels 92 riding on a track 94 formed on an inside surface of the rail 74, and a motor (not shown) for powering the wheels 92. The crane superstructure 70 can include suitable maintenance platforms and catwalks (not shown) to facilitate access by maintenance personnel to the various elevated parts of the crane 16.

Figure 5:
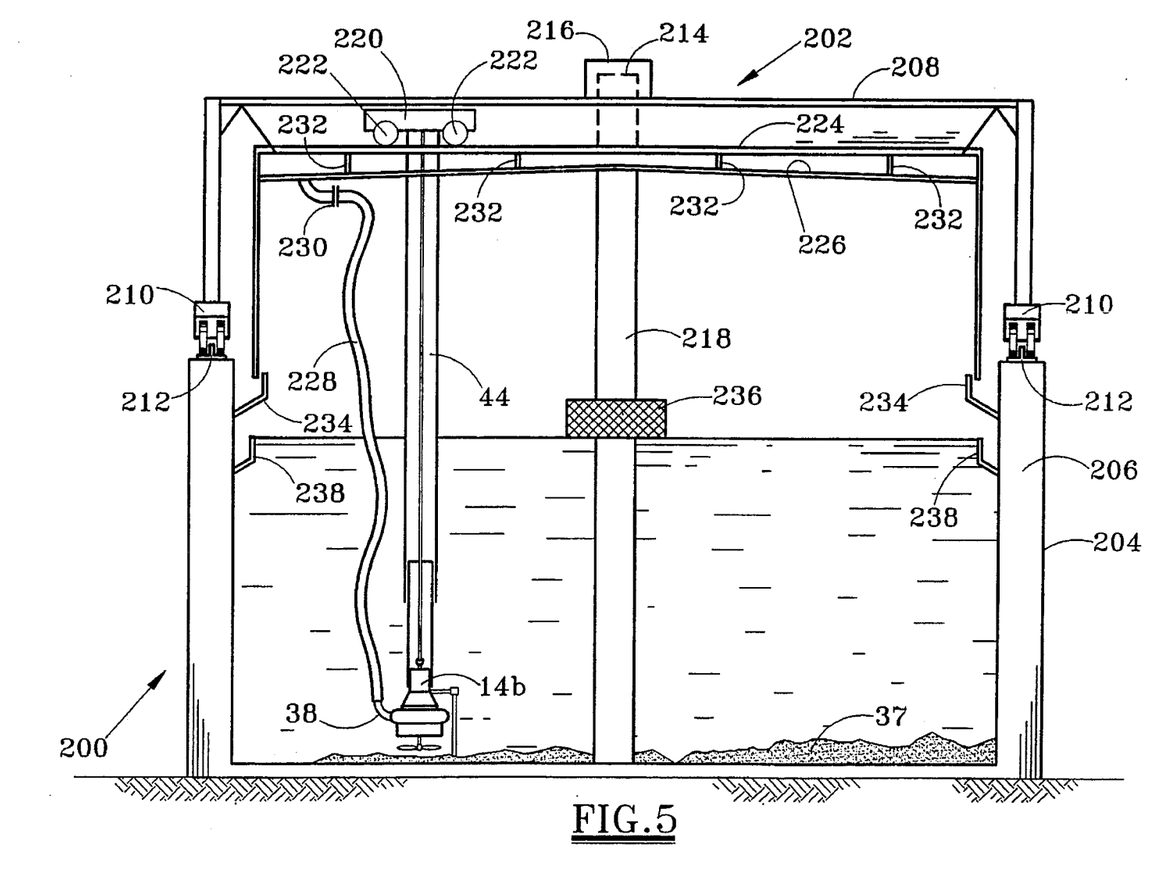
FIG. 5 is a cross-sectional view of another embodiment of the present sedimentation unit showing a circular basin spanned by a rotating bridge crane supported by a central column for moving the submersible pump around the basin.
Figure 6:
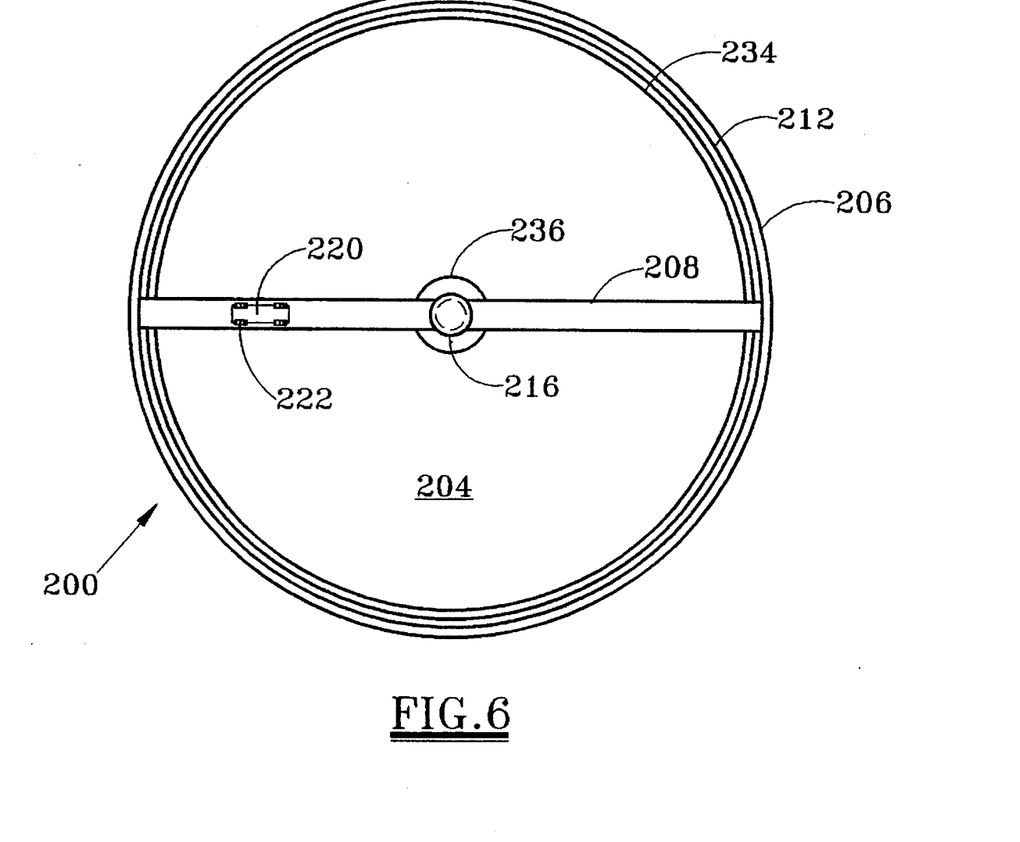
FIG. 6 is a plan view of the embodiment shown in FIG. 5.

Referring to FIGS. 5–6, an alternate embodiment 200 of the present sedimentation unit employs a conventional bridge-type crane 202 adapted for a circular shaped basin 204 having a wall 206. A traverse or bridge 208 spanning the diameter of the basin 204 has motorized cartridges 210 at either end for rotation thereof across the top of the basin 204. The cartridges 210 preferably operate on a monorail 212 secured at the top of the basin wall 206. The traverse 208 in this embodiment is rotatably supported by a bearing 214 contained in a housing 216 of a central support column 218.

A trolley 220 having wheels 222 engage a track 224 formed on the traverse 204. Operation of a pump 14b suspended from the trolley 220 by the suspension 44 discharges slurry into a sluice 226 via a flexible conduit 228 connected thereto by a fitting 230. The sluice is secured to a bottom of the traverse 204 by hangers 232. The slurry is directed by the sluice 226 to a slurry discharge channel 234 located adjacent the interior side of the basin wall 206. The solids suspended in liquid are fed to the basin 204 through a feedwell 236 and clarified liquid is discharged from the basin 204 as overflow into a liquid discharge channel 238 also located adjacent the interior side of the basin wall 206.

Figure 7:
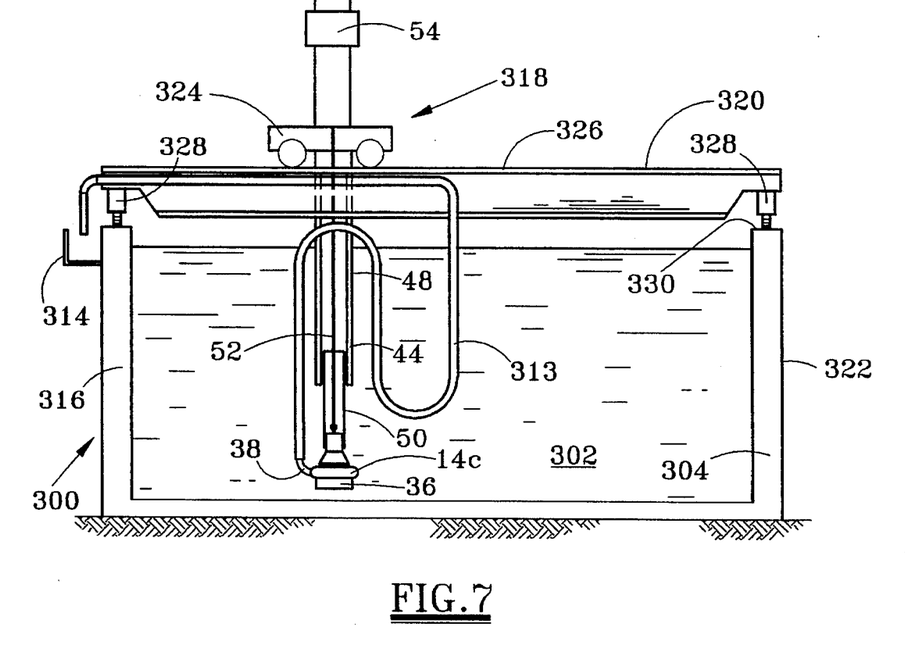
FIG. 7 is a cross-sectional view of a further embodiment of the present sedimentation unit showing a rectangular shaped basin, rigid pump suspension and bridge crane supported on the basin walls for moving the submersible pump around the basin.
Figure 8:
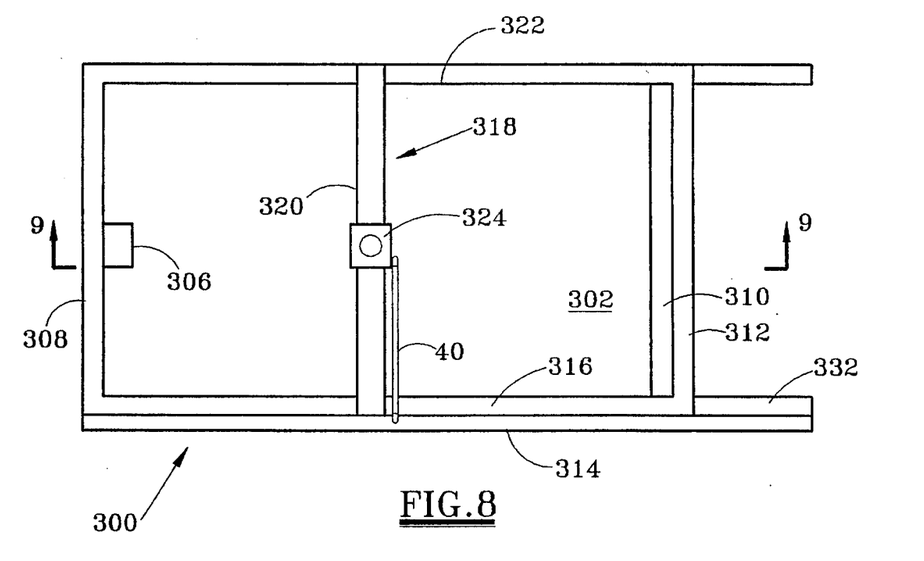
FIG. 8 is a plan view of the rectangular unit of FIG. 7.
Figure 9:
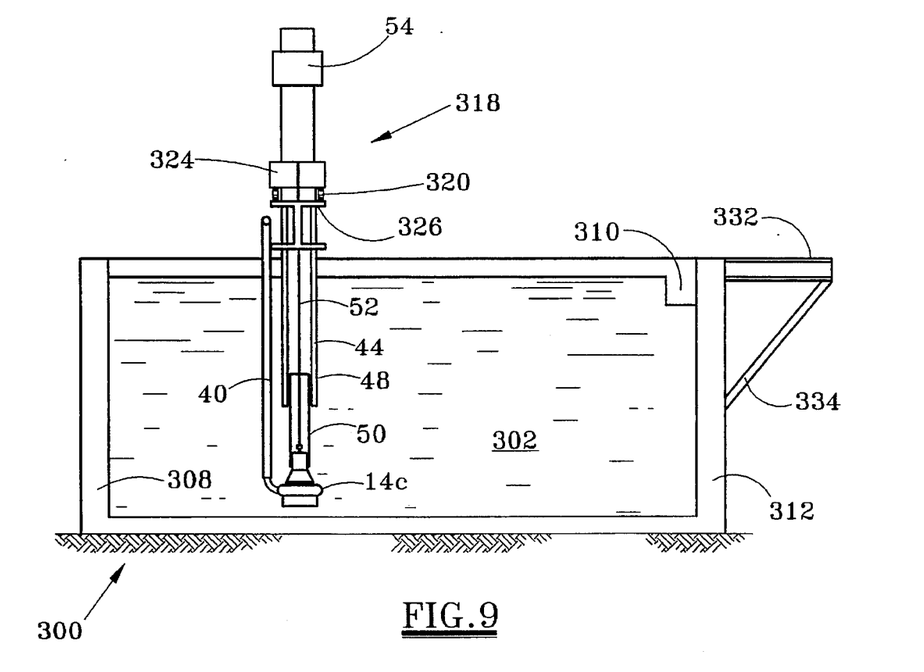
FIG. 9 is a side view in partial cross-section of the rectangular unit of FIG. 8 taken along the lines 9—9.

Referring to FIGS. 7–9, a further embodiment 300 of the present sedimentation unit employs a basin 302 having a rectangular wall 304. Liquid containing suspended solids is fed to the unit 300 through a feedwell 306 preferably located adjacent a first end section 308 of the wall 304. A clarified liquid is discharged from the unit 300 via a channel 310 located at an opposite end section 312 of the wall 304. A pump 14c discharges a slurry stream via a flexible conduit 313 to a channel 314 adjacent one of the side sections 316 of the wall 304.

The pump 14c and pump suspension 44 are horizontally positioned by a conventional bridge crane 318 spanning the basin 302. The crane 318 comprises a traverse or bridge member 320 supported on longitudinal side sections 316, 322 of the wall 304. The traverse 320 comprises the motorized trolley 324 operating from side-to-side across the basin 302 on a track 326. The trolley 324 includes a hanger (not shown) to support the flexible body of the conduit 313 so that the conduit length can be adjusted with respect to the lateral position of the trolley 324 from the slurry channel 314. The free end of the flexible conduit 313 is held stationary over the channel 314 by a bracket (not shown). The traverse 320 includes at either end one or more traveling cartridges 328 in which at least one cartridge 328 at each end is powered by an electric, pneumatic or hydraulic drive (not shown). The cartridges 328 are operatively associated with a suitable track 330 preferably mounted on top of the longitudinal side sections 316, 322. The track 330 preferably comprises a monorail but can alternatively be a dual-rail track. Operation of the trolley 324 positions the pump 14c laterally with respect to the basin 302. Operation of the cartridges 328 position the traverse 320 and pump 14c longitudinally with respect to the basin 302. The traverse 320 can include elevating legs (not shown) to raise the pump 14c (elevated by the suspension 44) above the basin wall 304 so that the traverse 320 and pump 14c can be moved on track extensions 332 supported by brackets 334 to facilitate maintenance operations.

To operate, any of the gravity sedimentation units 10, 200, 300 of the present invention in a continuous manner, a liquid such as water containing suspended solids is fed into the basin. Gravity over time causes the suspended solids to settle towards the bottom of the basin thus concentrating solids at the bottom and forming a clarified liquid at the top of the basin. The clarified liquid is typically removed as overflow into the liquid discharge channel. A slurry of the solids are pumped from the basin automatically in a continuous manner by the submersible pump 14 adapted for automated removal of the accumulated solids.

Solids accumulation information gathered by the sensor(s) is directed to a suitable controller unit(s) which directs the pump around the basin by operating the crane trolleys and winches via the various drive motors. Typically, the traverse moves over the basin, the pump suspension moves back and forth across the traverse and the pump moves up and down on the suspension. In one simple control scheme, the controller is programmed to move the pump over the bottom of the basin in a regular pattern to search for solids accumulations, stopping the travel of the pump and initiating pumping action when the sensor indicates the presence of accumulations, lowering the elevation of the pump suction as the solids are discharged, stopping the pumping action upon failure to detect solids accumulation at a given position and/or touching the bottom of the basin, and commencing the regular pump travel seeking additional solids accumulations. The pump search pattern can also be random or irregular. A timer (not shown) can be used for actuating the movements of the traverse and pump suspension at predetermined time intervals to commence pump travel and solids removal actions. The movements of the traverse over the basin and the pump suspension across the traverse preferably have independently adjustable rates of travel.

The present continuous gravity sedimentation unit is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

We claim:

1. A sedimentation unit for gravity separation of suspended solids from a liquid, comprising:

a basin having an inlet for introducing a liquid containing suspended solids, a bottom area for accumulating settled solids from the liquid, and a liquid outlet for discharging liquid reduced solids content;

a pump, having an agitator mounted on a common shaft with an impeller of the pump for rotation therewith, and the agitator is spaced below the impeller, for pumping a slurry of the accumulated solids to a slurry discharge from the basin;

a horizontal traverse with a drive for moving the traverse over the basin;

a pump suspension for supporting the pump from the traverse and vertically positioning the pump with respect to the traverse;

a motorized trolley for supporting the pump suspension from the traverse and adapted to move and reciprocate the pump suspension along a length of the traverse;

a solids detector for sensing a presence or absence of solids adjacent a suction of the pump; and a controller adapted to activate the pump when the solids detector senses the presence of the solids adjacent the pump suction.

2. The unit of claim 1, including a rail adjacent a wall of the basin on which the traverse drive runs.

3. The unit of claim 2, comprising a circular basin wall wherein the traverse has one end mounted on a central bearing and the drive comprises a motorized cartridge mounted at the other end for movement along the rail and rotation of the traverse about the bearing.

4. The unit of claim 3, wherein the inlet comprises a feed well adjacent the central bearing, the liquid outlet comprises a first channel adjacent the circular wall, and the slurry discharge includes a second channel adjacent the circular wall.

5. The unit of claim 2, comprising a rectangular basin wall wherein the drive comprises motorized cartridges mounted at opposite ends of the traverse for movement along the rail on opposing side sections of the wall.

6. The unit of claim 5, wherein the inlet comprises a feed well adjacent a first end section of the wall, the liquid outlet comprises a channel adjacent a second opposite end section of the wall, and the slurry discharge includes a channel adjacent one of the side sections of the wall.

7. The unit of claim 2, comprising a circular wall and a central support column having a bearing, wherein the drive comprises motorized cartridges mounted at opposite ends of the traverse for movement along the rail and the traverse is rotatably supported by the bearing.

8. The unit of claim 1, wherein the liquid outlet and slurry discharge comprise channels mounted adjacent a wall of the basin.

9. The unit of claim 8, wherein the slurry discharge includes a conduit supported from the transverse for directing pump discharge to the slurry discharge channel.

10. The unit of claim 1, wherein the traverse has elevated legs to raise the pump above a wall of the basin.

11. The unit of claim 1, wherein the solids detector comprises a capacitance sensor mounted adjacent the pump suction.

12. The unit of claim 1, wherein the solids detector comprises a high frequency sensor mounted adjacent the pump suction.

13. The unit of claim 1, wherein the solids detector comprises a torque switch operatively associated with the agitator shaft to provide a signal to the controller when the agitator is rotated in accumulated solids.

14. The unit of claim 13, including a two-speed motor for rotating the impeller shaft at a relatively low speed for sensing the presence of the accumulated solids and at a relatively high speed for pumping the accumulated solids.

15. The unit of claim 1, wherein the solids detector comprises a stress sensor operatively associated with the pump suspension to provide a signal to the controller when the suspension experiences a bending moment caused by resistance to horizontal movement of the pump into or through accumulated solids.

16. The unit of claim 1, comprising a controller operative with a pump winch in the pump suspension and the solids detector to vertically position the pump suction in a layer of accumulated solids.

17. The unit of claim 1, wherein the movements of the traverse over the basin and the pump suspension across the traverse have independently adjustable rates of travel.

18. The unit of claim 17, comprising a pump winch operable by the controller to adjust the vertical position of the pump to position the pump suction in an upper layer of the accumulated solids.

19. The unit of claim 1, including a timer for actuating the movement of the traverse and pump suspension at predetermined time intervals.

20. The unit of claim 1, wherein the pump suspension comprises a collar attached to the traverse by one or more pairs of cables.

* * * * *